US008284662B2

(12) United States Patent
Sargor et al.

(10) Patent No.: US 8,284,662 B2
(45) Date of Patent: Oct. 9, 2012

(54) FLEXIBLE, COST-EFFECTIVE SOLUTION FOR PEER-TO-PEER, GAMING, AND APPLICATION TRAFFIC DETECTION AND TREATMENT

(75) Inventors: Chandramouli Sargor, Sunnyvale, CA (US); Sachin Desai, Santa Clara, CA (US); Thalanayar Muthukumar, San Jose, CA (US)

(73) Assignee: Ericsson AB, Stockholm (SE)

( * ) Notice: Subject to any disclaimer, the term of this patent is extended or adjusted under 35 U.S.C. 154(b) by 90 days.

(21) Appl. No.: 12/043,788

(22) Filed: Mar. 6, 2008

(65) Prior Publication Data

US 2008/0219169 A1 Sep. 11, 2008

Related U.S. Application Data

(60) Provisional application No. 60/905,521, filed on Mar. 6, 2007.

(51) Int. Cl.
*G01R 31/08* (2006.01)
(52) U.S. Cl. .................... 370/230.1; 709/224
(58) Field of Classification Search ............... 370/230.1
See application file for complete search history.

(56) References Cited

U.S. PATENT DOCUMENTS

| | | | | |
|---|---|---|---|---|
| 7,545,743 | B2 * | 6/2009 | Oyama et al. ............. | 370/230.1 |
| 7,554,983 | B1 * | 6/2009 | Muppala ................... | 370/392 |
| 2002/0118644 | A1 | 8/2002 | Moir | |
| 2003/0140168 | A1 * | 7/2003 | Peshkin et al. ............ | 709/245 |
| 2005/0105476 | A1 * | 5/2005 | Gotesdyner et al. ...... | 370/254 |
| 2006/0029104 | A1 | 2/2006 | Jungck | |
| 2006/0087969 | A1 | 4/2006 | Santiago et al. | |
| 2006/0233100 | A1 | 10/2006 | Luft et al. | |
| 2006/0233101 | A1 * | 10/2006 | Luft et al. ................. | 370/229 |
| 2007/0006293 | A1 * | 1/2007 | Balakrishnan et al. .... | 726/13 |
| 2008/0201772 | A1 * | 8/2008 | Mondaeev et al. ........ | 726/13 |
| 2009/0077228 | A1 * | 3/2009 | Weil et al. ................. | 709/224 |

OTHER PUBLICATIONS

International Search Report and Written Opinion for PCT/US08/03118 mailed Jul. 7, 2008, 10 pages.
PCT Chapter I International Preliminary Report on Patentability (IPRP Chapter I) PCT/US2008/003118 mailed Sep. 17, 2009. (7 pages).
Roughan, et al., "Class-Of-Service Mapping for QoS: A Statistical Signature-based Approach to IP Traffic Classification", matthew.roughan@adelaide.edu.au, School of Mathematical Sciences, University of Adelaide, SA 5005, Australia, AT&T Labs-Research, Florham Park, NJ 07932-0971, USA, pp. 138-148, Oct. 25-27, 2004.
Constantinou, et al., Identifying Known and Unknown Peer-To-Peer Traffic, MIT, fivos,pmavrom@mit.edu, Fifth IEEE International Symposium on Network Computing and Applications (NCA '06) 0-7695-2640-03/06, 2006, 8 pgs.

* cited by examiner

*Primary Examiner* — Anh-Vu Ly
*Assistant Examiner* — Matthew Hopkins
(74) *Attorney, Agent, or Firm* — Blakely, Sokoloff, Taylor & Zafman LLP

(57) ABSTRACT

A method and apparatus for detecting peer traffic based on a heuristic model and deep packet inspection is described. A suspect set of peer packets is detected using a heuristic model. From the suspect set of peer packet, a set of verified peer packets is detected using deep packet inspection. The set of verified peer packets is processed according to the peer processing policy, while the non-verified peer packets is processed according a non-peer policy. Furthermore, the statistics are generated from the set of suspect peer packet. These statistics are used to update the heuristic model.

17 Claims, 9 Drawing Sheets

FLEXIBLE, COST-EFFECTIVE SOLUTION FOR PEER-TO-PEER, GAMING, AND APPLICATION TRAFFIC DETECTION AND TREATMENT

CROSS-REFERENCE TO RELATED APPLICATIONS

This application claims the benefit of U.S. provisional patent application No. 60/905,521, entitled "A Flexible, Cost-Effective Solution for Peer-To-Peer, Gaming, and Application Traffic Detection & Treatment", filed Mar. 6, 2007.

BACKGROUND

1. Field

Embodiments of the invention relate to the field of computer networking; and more specifically, to peer-to-peer, gaming, and application traffic detection and treatment.

2. Background

Peer-to-peer (peer), gaming and application traffic has come to be the lion's share of the data traffic on the Internet. Peer traffic is defined herein as traffic used, generated, consumed, processed, and/or exchanged by peer-to-peer, gaming and other peer application that communicate this traffic between end stations. Peer traffic typically comprises data packets ("packets") that can include data or control information used by the peer, gaming, and/or other peer applications. Similarly, peer networks are the network used by peer, gaming, and/or other peer applications.

With most networks not engineered for this kind of traffic, peer has the ability to impair networks and upset traditional network design philosophies and principles. Traditional network design is based on the assumption that not every client is transmitting and/or receiving traffic at an intermittent rate and not a high, sustained rate. Typically, a user sends email or surfs the web, which are both intermittent uses of the network. However, for example, a savvy user may want to initiate a movie download which can result in a high demand placed on the network over a long period of time. As such, service providers typically have an important goal of detecting this traffic and using customized treatment techniques.

Peer networks are highly distributed network architectures such that all clients in the peer network provide bandwidth, storage space, and computing power for the network. Adding a client to the peer network increases the capacity of the peer network. By providing the computing resources clients make available content stored on the client to other directly without going through a central server. In a pure peer network, there is no central server and each client publishes lists of available content to the other clients in the peer network. Alternatively, in a hybrid peer network, central servers do not store the available content, but instead typically host information about which clients are part of the peer network and what content each client has available.

Typical applications of peer networks is exchanging of content between clients. While in one embodiment, content is audio-visual media (music, pictures, movies, sounds, etc.), in alternate embodiments, content can be other types of entities capable of being transmitted across the peer network (documents, software, etc.). Because each piece of content can be large, continual exchanging of content can put a high strain on the underlying network supporting the peer network. In addition, peer networks tend to be ad hoc, meaning peer networks are overlaid on a service provider's existing network without the service provider's permission.

Gaming applications allow one gamer at one end station to play another gamer at another end station. In one embodiment, gaming applications typically uses a client-server model where a central server controls the game between different gamers. In an alternate embodiment, the gamers directly transmit information between the gamer's end stations. Other peer applications known in the art are voice over Internet Protocol (VOIP), such as SKYPE, etc.

FIG. 1 illustrates one embodiment of a service provider network 100 with a router forwarding traffic between end stations content servers through a network. In FIG. 1, network 100 comprises end stations 102A-C, router 104, core network 106, and content servers 108A-B. End stations 102A-C couple to router 104 and router couples to content servers 108A-B through core network 106. While in one embodiment, end station 102A-C are home personal computers, in alternate embodiments, end stations can be the same or different type of machine (e.g. business computer, personal digital assistant, cell phone, game console, handheld game system, laptop) computer, etc.). End stations can couple to router 104 through any one of the means know in the art (e.g., Ethernet, wireless, digital subscriber line (DSL), cable modem, Fiber, etc.). Router 104 provides an entry point into core network 106 by forwarding data traffic from end stations 102A-C to content servers 108A-B, from content servers 108A-B to end stations 102A-C, and data traffic going between end stations 102A-C. While in one embodiment, router 104 is an edge router that forwards traffic between the edge network servicing end stations 102A-C and core network 106, in alternate embodiments, router 104 can be a router or switch positioned differently in the service provider's edge and/or core networks.

Core network 106 is the backbone network of the service provider that typically has high capacity to handle that high volume of traffic traveling through network 100. Content servers 108A-B serve content and/or control information for peer, gaming, and other applications to end stations 102A-C. In one embodiment, content servers 108A-B host peer services by keeping information on the peers in the networks (e.g., end stations 102A-C) and responds to requests for information. In this embodiment, content servers 108A-B keep track of what end stations 108A-C has to share with the other end stations and makes this information available to other interested end stations. In an alternate embodiment, the peer network does not use the content servers, but allows for direct communication between the corresponding end stations 102A-C.

Because peer networks generate high volumes of traffic, service providers typically try to control the flow of peer traffic. Controlling of peer traffic typically entails detecting the peer traffic and then applying a policy on how to treat the traffic. FIG. 2 (Prior Art) is an exemplary flow diagram of method 200 for detecting and processing peer traffic. In FIG. 2, at block 202, method 200 identifies the peer traffic. Typically, there are two basic ways to detect peer traffic: heuristic model analysis and deep packet inspection (DPI).

A heuristic model analysis identifies peer traffic by comparing a traffic pattern to a known peer signature without inspecting the contents of each packet. For example, volume of traffic above a certain rate from one end station to another may characterize peer traffic. Alternatively, a burst pattern may also signal peer traffic. Heuristic models are based on external characteristics of the packets and packets flow. While in one embodiment, a heuristic model is based on duration of the packet flow, in alternate embodiments, the heuristic is based on the same and/or different characteristics (average packet size, inter packet gap, etc.) For example, and by way of illustration, a movie download may have an open connection for hours and/or a VOIP call may have a fixed size interpacket gap. The advantage to a heuristic model is that because there is no packet inspection, the computational resources needed are relatively small. While heuristic model analysis typically accurately detects existing peer traffic, heuristics models tend be over-inclusive by detective additional traffic as peer traffic. Thus, some legitimate services may be interrupted or disconnected altogether because of this misidentification.

On the other hand, DPI inspects the contents of each and every packet in the data traffic to determine if the packet is part of peer traffic. Packets involved in peer traffic have characteristic data content patterns of each packet. Peer networks typically use two types of packets: control packets and data packets. Controls packet contains information to setup and maintain peer content exchanges. Data packets contain the data being used in the peer transaction. DPI matches the data content pattern of the control and/or data peer packet with known data content patterns. DPI models are very accurate and do not suffer from the over-inclusive problems of the heuristics approach. Nevertheless, DPI is very computational intensive when DPI is used on every packet flowing through a high-throughput network element, such as router 104.

At block 204, method 900 processes the packets that are part of the identified peer traffic. While in one embodiment, method 200 simply drops these packets, in alternate embodiments, method 200 processes give the packets differently (transmits at a fixed or reduced transmission rate, marks the packets as peer, preferential treatment, etc.).

Peer traffic can be a severe problem for a service provider. The common way to handle this problem is to detect peer traffic and either drop the peer traffic or rate limit it so as to not disrupt the service provider's network. Nevertheless, the two ways to detect peer traffic have drawbacks. The heuristic model approach identifies too much traffic as peer traffic, whereas DPI is very computationally intensive.

BRIEF SUMMARY

A method and apparatus for detecting peer traffic based on a heuristic model and deep packet inspection is described. A suspect set of peer packets is detected using a heuristic model. From the suspect set of peer packets, a set of verified peer packets is detected using deep packet inspection. The set of verified peer packets is processed according to the peer processing policy, while the non-verified peer packets is processed according to a non-peer policy. Furthermore, statistics are generated from the set of suspect peer packets. These statistics are used to update the heuristic model.

BRIEF DESCRIPTION OF THE DRAWINGS

Embodiments of the invention may be best understood by referring to the following description and accompanying drawings which illustrate such embodiments. The numbering scheme for the Figures included herein is such that the leading number for a given element in a Figure is associated with the number of the Figure. However, element numbers are the same for those elements that are the same across different Figures. In the drawings.

DETAILED DESCRIPTION

In the following description, numerous specific details such as network element, heuristic model, deep packet inspection, packet processor deep packet inspection processor, packet, peer packet, processor card, line card, deep packet inspection card, control card, and interrelationships of system components are set forth in order to provide a more thorough understanding of the invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "all example embodiment", etc., indicate that the embodiment described may include a particular feature, structure, or characteristic but every embodiment may not necessarily include the particular feature, stricture, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the term "coupled," along with its derivatives, is used. "Coupled" may mean that two or more elements are in direct physical or electrical contact. However, "Coupled" may also mean that two or more elements are not in direct contact with each other, but yet still co-operate or interact with each other.

Exemplary embodiments of the invention will now be described with reference to FIGS. 3-9. In particular, the operations of the flow diagrams in FIGS. 3 and 8 will be described with reference to the exemplary embodiments of FIGS. 4-7 and 9. However, it should be understood that the operations of these flow diagrams can be performed by embodiments of the invention other than those discussed with reference to FIGS. 4-7 and 9 and that the embodiments discussed with reference to FIGS. 4-7 and 9 can perform operations different than those discussed with reference to these flow diagrams.

Figure 3:
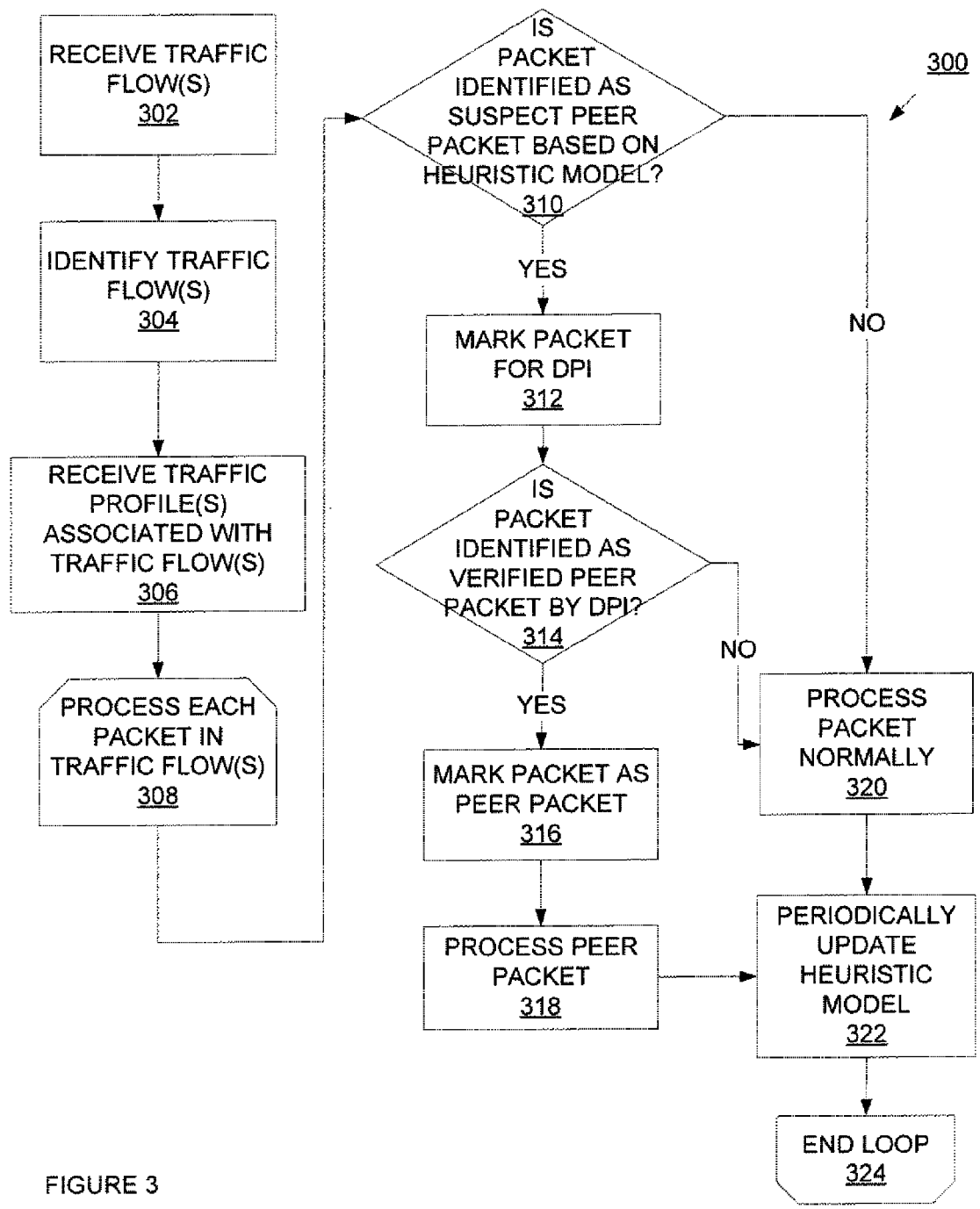
FIG. 3 is an exemplary flow diagram for detecting and processing peer traffic according to one embodiment of the invention.

A method and apparatus for detecting peer traffic based on a heuristic model and deep packet inspection is described. According to one embodiment of the invention, peer traffic is detected by heuristic model detection and verified with deep packet inspection. Peer traffic is processed according to the peer traffic policy, while non-peer traffic is processed according to a non-peer traffic policy. According to another embodiment of the invention, an ingress line card of a network: element receives the traffic and detects suspect peer traffic. Suspect peer traffic includes actual peer traffic and non-peer traffic. A deep packet inspection processing card detects the verified peer traffic in the suspect card using deep packet inspection. An egress line card processes the verified peer traffic according to the peer traffic policy, and processes the non-peer traffic according to the non-peer traffic policy. FIG. 3 is an exemplary flow diagram of method 300 for detecting and processing peer traffic according to one embodiment of the invention. In FIG. 3, at block 302, method 300 receives the stream of traffic. The stream of traffic typically comprises peer and non-peer traffic. In one embodiment, method 300 receives the traffic stream from an ingress port of the network element.

At block 304, method 300 identifies the traffic flow(s). There may one or more traffic flows in the received stream of traffic. A traffic flow is a stream of packets that are related by one or more similar characteristics. A traffic flow may be characterized by one or more of ingress port, egress port, source address, destination address, packet type, virtual local area network (VLAN) tag, multi-protocol label switching tag (MPLS), time of day, application type, average packet size, packet flow duration, length of connection, etc. Traffic flows are used to group streams of packets such that method 300 applies a specific traffic processing policy the packets in the respective traffic flow. A traffic flow may have the same or different traffic processing policy as another traffic flow. A traffic processing policy ("traffic policy") is a policy used by the network element to process the packets. A traffic policy may specify the maximum/minimum transmission rate for the traffic flow, to drop certain packets within the traffic flow, mark certain packets, enforce traffic shaping parameters, etc. In one embodiment, the traffic policy may indicate to detect peer traffic and how to process such traffic, such as which heuristic model to use to detect suspect peer traffic. Thus, the traffic policy for the traffic flow can be associated with a heuristic model common to none, some or all of the other traffic flows.

At block 306, method 300 receives the traffic profiles associated with the identified traffic flow(s). Method 300 uses these traffic profiles to process the packets in the identified traffic flow(s).

Method 300 further executes a processing loop (blocks 308-324) to detect and process peer traffic. At block 310, method 300 determines if the packet is identified as a suspect peer packet based on heuristic model analysis. Suspect means the packet is initially identified as a peer packet. However, because heuristic model analysis tends to over-identify packets as peer packets, the packet identified is not a verified peer packet. If so, at block 314, method 300 marks this packet for DPI processing In one embodiment, method 300 adds a tag or other suitable marking known in the art indicating the packet is a suspect peer packet requiring DPI.

At block 314, method 300 determines if the suspect peer packet is a verified peer packet using DPI. Heuristic model analysis reduces the number of possible peer packets that set DPI. The number reduced depends on the accuracy of the heuristic model and the nature of the traffic in the traffic flow. Because there are fewer packets requiring DPI, method 300 is less computational intensive than peer detection solely based on DPI. While in one embodiment, method 300 detects both peer control and data packets, in alternate embodiments method detects either control or data packets. Being able to detect control and data packets separately allows a service provider to treat peer control and data exchange separately. In one embodiment, DPI detects control packets, but not data packets, so that a service provider can deny peer content exchanges by dropping the control packets. This is an efficient way to deny peer services because the bandwidth intensive part of peer, content exchanges, never starts when the peer control packets are blocked. In another embodiment, DPI detects peer data packets so that a service provider may rate limit peer content exchanges to a low enough transmission rate to either discourage peer services, keep peer use at a point that does not disrupt a service provider's network, or otherwise treat peer traffic.

If the packet is identified as a verified peer packet by DPI, the verified packet is processed as a peer packet at block 318. At block 318, method 300 marks the packet for as a verified peer packet. In one embodiment, method 300 marks the packet as a verified peer packet using a tag or other suitable marking. At block 318, method 300 processes the verified peer packet according to the traffic profile associated with the corresponding traffic flow. In one embodiment, method 300 drops the packet, in alternate embodiments method 300 processes the peer packet in alternate ways (e.g., transmits the packet at a restricted rate, marks the packet as low priority, etc.). Control passes to block 322 below.

Returning to block 314, if the packet is identified as a non-peer packet, method 300 processes the packet as a non-peer packet. In one embodiment, method 300 processes the packet according to the respective traffic profile. Control passes to block 322.

At block 322, method 300 periodically updates the heuristic model for initially detecting peer traffic. While in one embodiment, method 300 updates the heuristic model used for all traffic flows, in alternate embodiments, method 300 updates the heuristic model associated with a specific traffic flow(s). As stated above, the success of the heuristic model depends on the model and the type of traffic method 300 is detecting. By updating the heuristic model used by method 300, in real time, the success of the heuristic model in accurately detecting peer traffic is increased. While in one embodiment, the update periodicity is based on the number of peer packet processed (both suspect and peer), in alternate embodiments, the update periodicity is based on a different metric (e.g., number of suspect peer packets, number of verified peer packets, time elapsed, etc.). Updating of the heuristic model is further described in FIG. 8 below. At block 324, the processing loop ends.

Figure 4:
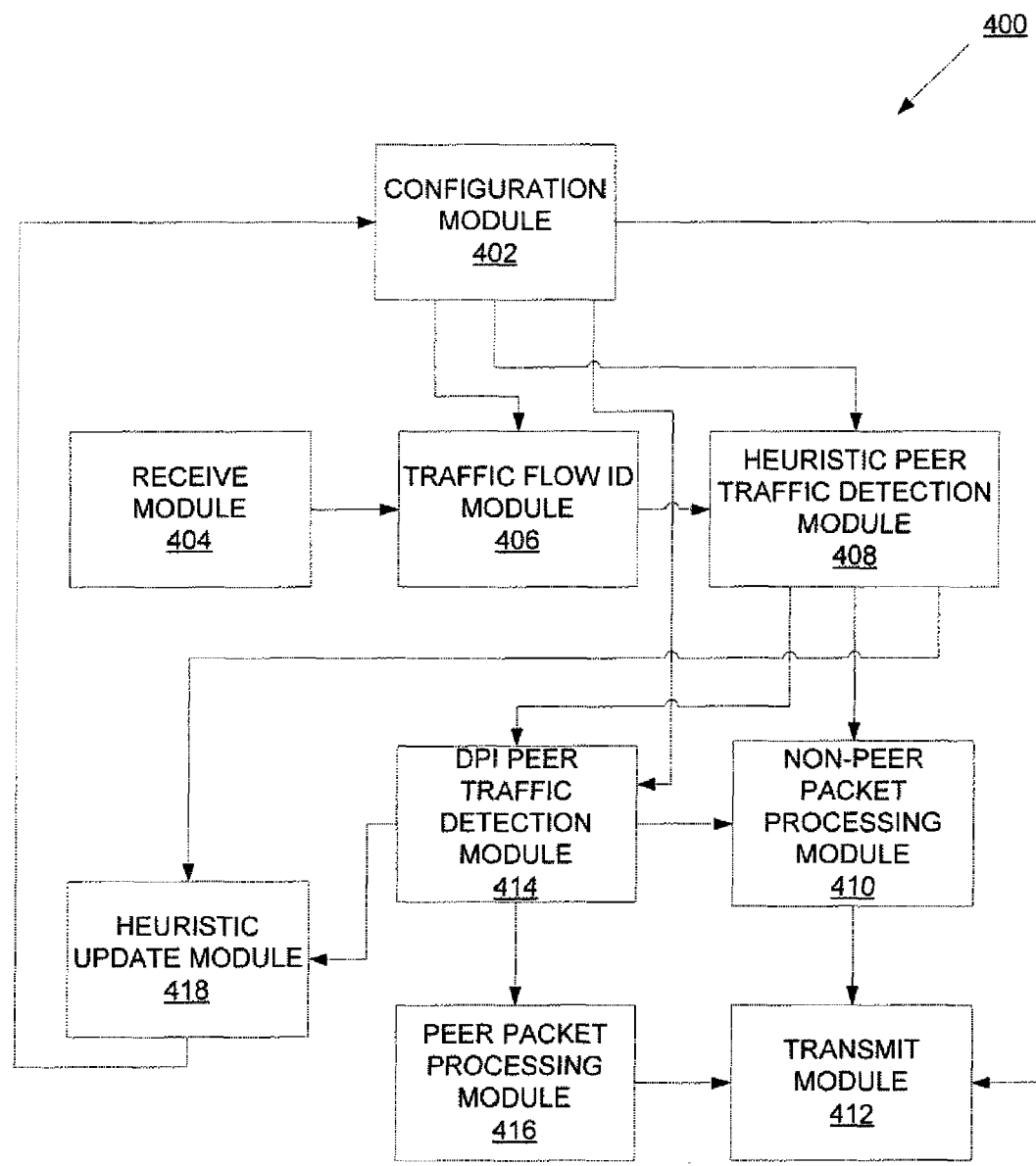
FIG. 4 is a block diagram illustrating peer detection and processing system according to one embodiment of the system.

FIG. 4 is a block diagram illustrating peer detection and processing system 400 according to one embodiment of the system. In FIG. 4, system 400 comprises configuration module 402, receive module 404, traffic flow detection module 406, heuristic peer traffic detection module 408, packet processor 410, transmit module 412, DPI module 414, peer packet processor 416, and heuristic update module 418. Configuration modules 402 couples to traffic flow detection module 408, heuristic peer traffic detection module 410, transmit module 412, DPI peer traffic detection module 416, and heuristic update module 420. Traffic flow detection module 406 further couples to receive module 404 and heuristic peer traffic detection module 408. Heuristic peer traffic detection module 408 further couples to packet processor 410, DPI peer traffic detection module 414 and heuristic update module 418. In addition, DPI peer traffic detection module 414 couples to packet processor 410, heuristic update module 418, and peer packet processor 416. Packet 410 and peer 416 processors couple to transmit module 412.

Configuration module 402 creates and stores the configuration for the traffic flow detection 408, heuristic peer traffic detection 410, transmit modules 412, and DPI peer traffic detection 416 modules. In one embodiment, configuration module creates configuration data Such as the traffic flow policies, heuristic models and DPI profiles. Configuration module 402 further configures traffic flow detection 408, heuristic peer traffic detection 410, transmit modules 412, and DPI peer traffic detection 416 modules.

Receive module 404 receives the stream of traffic comprising one or more traffic flows and feeds the stream to the traffic flow detection module 406. Traffic flow detection module 406 takes the traffic stream and identifies the one of more traffic flows in the stream of traffic as described in FIG. 3, block 304. Traffic flow detection module 406 further tags the traffic according the to traffic profile associated with each traffic flow in the stream of traffic as described in FIG. 3, block 306. In addition, traffic flow detection module 306 forwards the identified traffic flows to heuristic peer traffic detection module 408.

For each packet in each traffic flow, heuristic peer traffic detection module 408 identifies peer packets according the current heuristics model as described in FIG. 3, block 310 above. Packet(s) identified as peer are marked as suspect peer packets are further detected by DPI detection module 414. Packets designated as non-peer packets by heuristic peer traffic detection module 408 are forwarded to packet processor for non-peer packet processing as described in FIG. 3, block 320. Heuristic peer traffic detection module 408 further feeds statistics about peer detection to heuristic updated module 418.

DPI peer traffic detection module 414 receives the identified peer packets for heuristic peer traffic detection module 408 and inspects each packet to verify if the packets are indeed peer packets as described in FIG. 3, block 314. Each verified peer packet is marked as a verified peer packet and forwarded to peer packet processor 410 as described in FIG. 3, block 316. Peer packet processor 410 processes the peer packets according to the traffic associated with each packet as described in FIG. 3, block 318. Thus, peer packet belonging to different traffic flows can be treated differently. While in one embodiment, peer packet processor 410 drops the peer packets, in alternate embodiments, peer packet processor treats peer packet differently (e.g., transmits the packet at a restricted rate, marks the packet as low priority, etc.). If packet processor 416 does not drop the verified peer packets, the verified peer packets are forwarded to transmit module 412, which transmits the packets.

Transmit module 412 receives peer packets form peer packet processor 416 and non-peer packets from packet processor 410 and transmits the packets.

Figure 5:
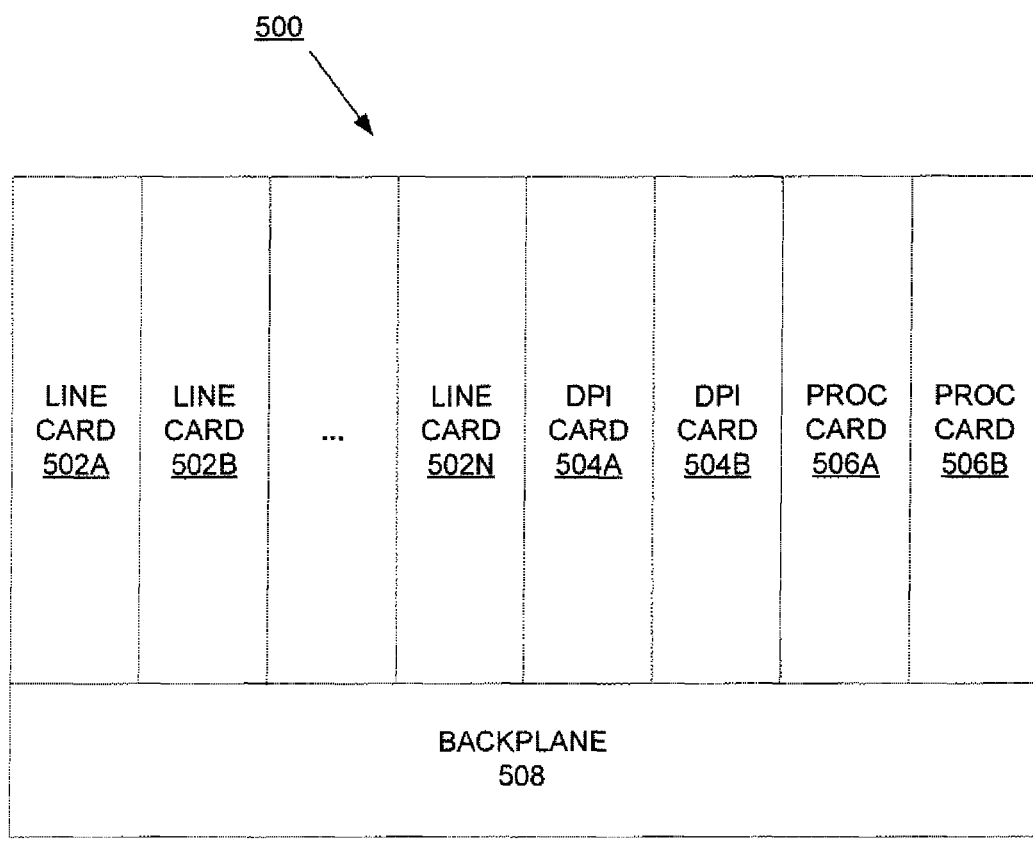
FIG. 5 is a block diagram of a network element that includes a peer detection and processing system according to one embodiment of the system.

FIG. 5 is a block diagram of a network element 500 that includes peer detection and processing system according to one embodiment of the system. While in one embodiment of the invention, backplane 508 is coupled to line cards 502A-N, DPI cards 504A-B, and processing cards 504A-B, other embodiments of the invention describe multiple other devices and/or modules coupled to chassis 508. While in one embodiment, peer algorithm is may be part of line cards 502A-N and/or DPI cards 504A-B, alternate embodiments may have alternate card arrangements (a combined line and DPI card with one or more ports and a forwarding engine, one processing card per line card, multiple processing card per line card, etc.). Network element 500 includes line cards 502A-N to forward packets.

Figure 6:
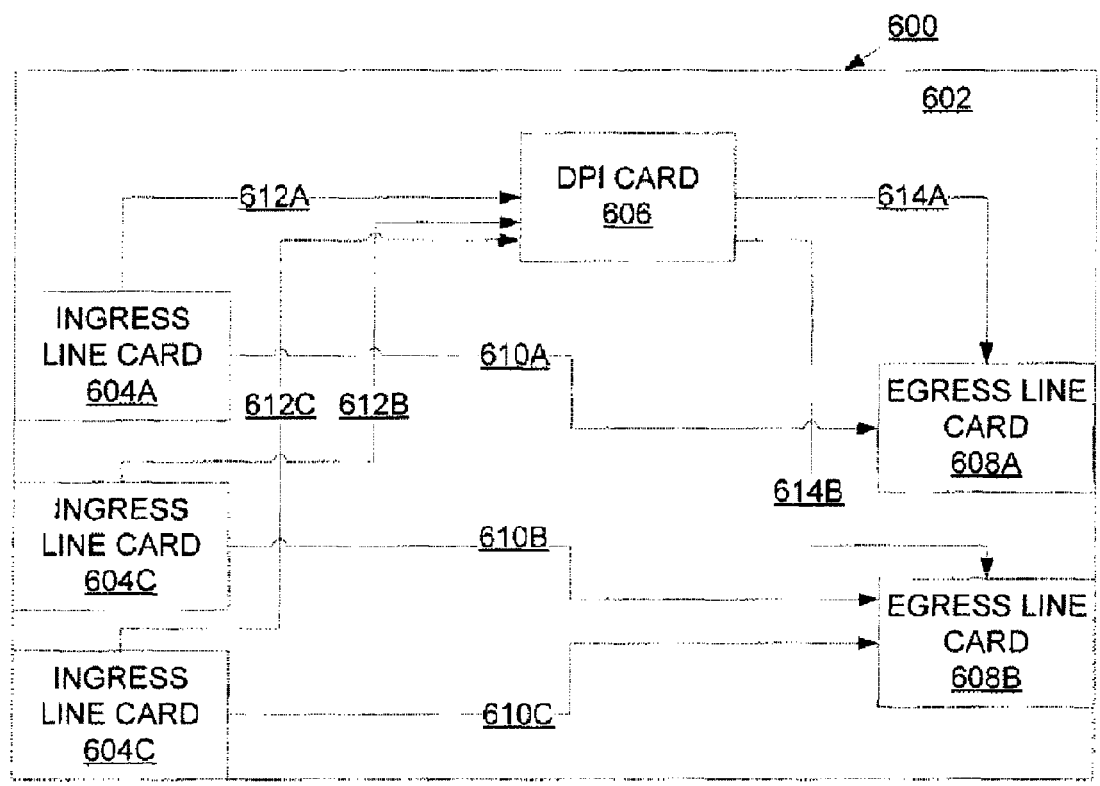
FIG. 6 is a block diagram illustrating data flows between ingress, egress and DPI cards according to one embodiment of the system.

FIG. 6 is a block diagram of a network element 600 illustrating traffic flows of peer and non-peer traffic between ingress, egress and DPI cards according to one embodiment of the system. In FIG. 6, network element 600 comprises a backplane 602 coupled to ingress line cards 604A-C, DPI card 606, and egress line cards 608A-B. In one embodiment, ingress line card 104A sends its non-peer traffic 610A to egress line card 608A for transmission, whereas ingress line cards 6048B-C sends their non-peer traffic 610B-C to egress line card 608B for transmission. In this embodiment, ingress line cards 604A-C forward the suspect peer traffic 612A-C to DPI card 606 for further peer inspection. Ingress line cards 604A-B split the traffic stream into peer traffic 662A-C headed for the DPI card for further detection and non-peer traffic 610A-C forwarded to the e4gress line cards 608A-B for transmission. In one embodiment ingress line card 604A detects suspect peer traffic using the heuristic model, which is then further inspected by DPI card 606 to determine if the packets contained in traffic 612A are indeed peer traffic. Packets that are identified by DPI card 606 as being non-peer traffic and peer traffic 614A-B identified as being transmitted are forwarded to egress line cards 608A-B for transmission. Traffic 610A-C identified by ingress line cards 604A-C is forward directly to the respective egress lines cards 608A-B for transmission. While in this embodiment, DPI card 606 is a separate card, in alternate embodiment, DPI functionality is part of some or all of the ingress 604A-C and/or egress line card 608A-C. Furthermore, in alternate embodiments, ingress line card 604A-C can be egress line cards 608A-C and visa versa, and/or a line card can be both ingress and egress line card for the same traffic flow. In addition, while ill one embodiment, one DPI card perform DPI for some or all of the line cards in network element 600, in alternate embodiments, multiple DPI cards perform DPI for one line card, and/or a combination therein.

Figure 7A:
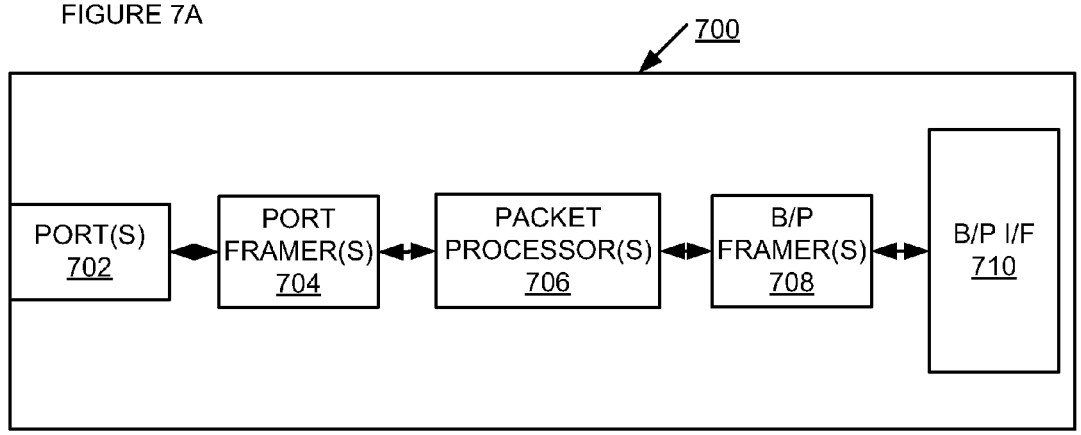
FIG. 7A is a block diagram illustrating a line card according to one embodiment of the invention.

FIG. 7A is a block diagram illustrating a line card 700 according to one embodiment of the invention. In FIG. 7A, line card 700 comprises port(s) 702, port framer(s) 704, packet processor(s) 706, backplane framer(s) 708, and backplane connector 710. Point(s) 702 couple to port framer(s) 704, which couple to packet processor(s) 706. Packet processor(s) 706 couple to backplane framer(s) 708, which couple to backplane connector.

Port(s) 702 are interfaces that couple line card 700 to an external network. Line card 700 can be either an ingress line card, egress line card or both. While in one embodiment, port(s) 702 is one or more 10/100/1000 Base-T Ethernet points, in alternate embodiments, port(s) can be one or more of the same or different interfaces (e.g., synchronous optical network (SONET) fiber, asynchronous transfer mode (ATM) interfaces, wireless, Gigabit Ethernet fiber, etc.).

Port framer(s) 704 convert the frames received on port(s) 702 into packets suitable for packet processor 706 and visa versa. While in one embodiment, there are two port framers 704, one for ingress traffic and one for egress traffic in alternate embodiments, there are less or more port framers 704.

Packet processor(s) 706 processes the packets entering or exiting line card 700. While in one embodiment, packet processor(s) 706 apply a heuristic model to detect suspect peer traffic, in alternate embodiments packet processor(s) perform additional other functions (e.g. switch or route traffic, detect traffic flows, apply traffic policy, traffic shape the packets, etc.). While FIG. 7A illustrates one packet processor, alternate embodiments may have more than one packet processor.

Backplane framer(s) 708 convert the packets received from packet processors) 706 into frames suitable for transmission across a backplane via backplane interface 710 and visa versa. While in one embodiment, there are two backplane framers 708, one for ingress traffic and one for egress traffic, in alternate embodiments, there are less or more backplane framers 708. Backplane interface 710 is the interface between line card 700 and the backplane of the network element.

Figure 7B:
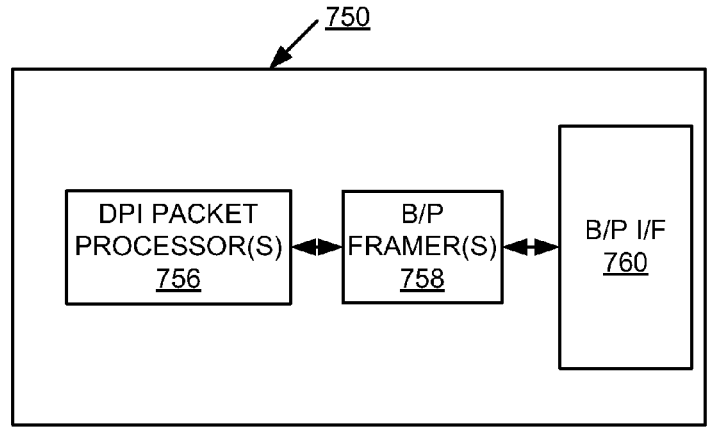
FIG. 7B is a block diagram illustrating a DPI card according to one embodiment of the invention.

FIG. 7B is a block diagram illustrating a DPI card 750 according to one embodiment of the invention. DPI card 750 differs from line card 700 in that DPI card process packets received form the backplane and not from some external source, such as line card 700. DPI card comprises DPI packet processor(s) 752 coupled to backplane framer(s) 754, which couples to backplane interface 756. Backplane framer converts frames received form the backplane into packets suitable for DPI by DPI packet processor(s) 752 and visa versa. While in one embodiment, DPI card 750 has one DPI packet processor 752, in alternate embodiments DPI card 750 may have more than one DPI packet processor 752. DPI packet processor(s) perform the DPI to detect peer traffic as described in FIG. 3, block 318.

Figure 8:
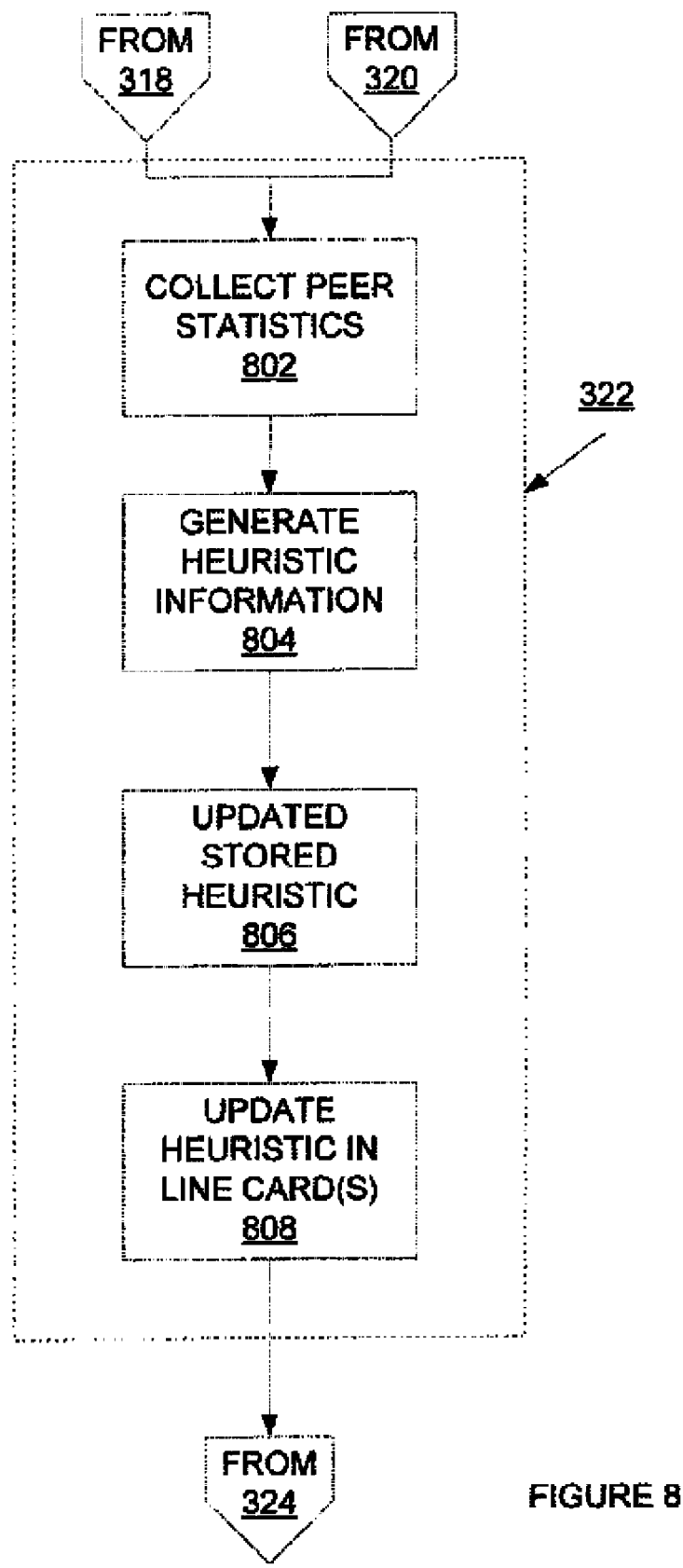
FIG. 8 is an exemplary flow diagram for updating the heuristic peer detection system according to one embodiment of the invention.

FIG. 8 is an exemplary flow diagram of method 800 for periodically updating the heuristic peer detection system according to one embodiment of the invention. While in one embodiment, the update periodicity is based on the number of peer packet processed (both suspect and peer), in alternate embodiments, the update periodicity is based on a different metric (e.g., number of suspect peer packets, number of verified peer packets, time elapsed, etc.). In FIG. 8, at block 802, method 300 collects peer statistics from heuristic peer identifier, DPI peer identifier, or both. While one embodiment, method 800 collects statistics about average packet size, in alternate embodiments, method 800 collects the same and/or different statistics (packet flow duration, connection length, inter-packet gap, etc.).

At block 804, method 300 generates heuristic in formation based on the collected statistics. As described above, heuristic information comprising one or more of: average packet size, packet flow duration, connection length inter-packet gap, etc. At block 808, method 300 updates the heuristic models on the line cards performing heuristic peer detection.

At block 806, method 300 updates the stored heuristics. Using the stored heuristics, method 300 updates the heuristics in the line cards performing peer detection.

Figure 1:
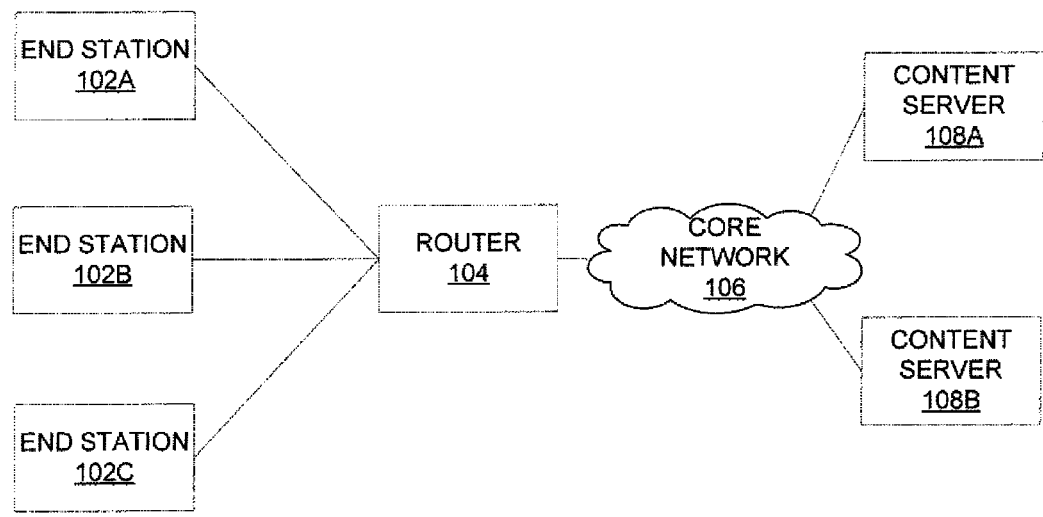
FIG. 1 (Prior Art) illustrates one embodiment of router forwarding traffic between end stations content servers through a network.
Figure 2:
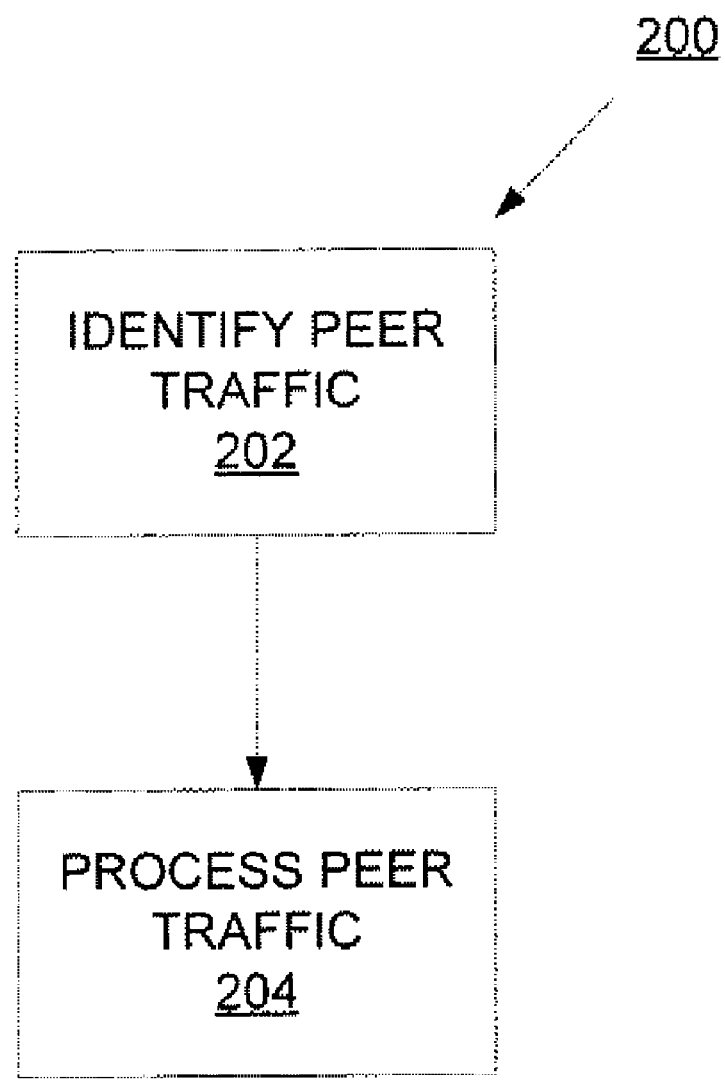
FIG. 2 (Prior Art) is an exemplary flow diagram for detecting and processing peer traffic.
Figure 9:
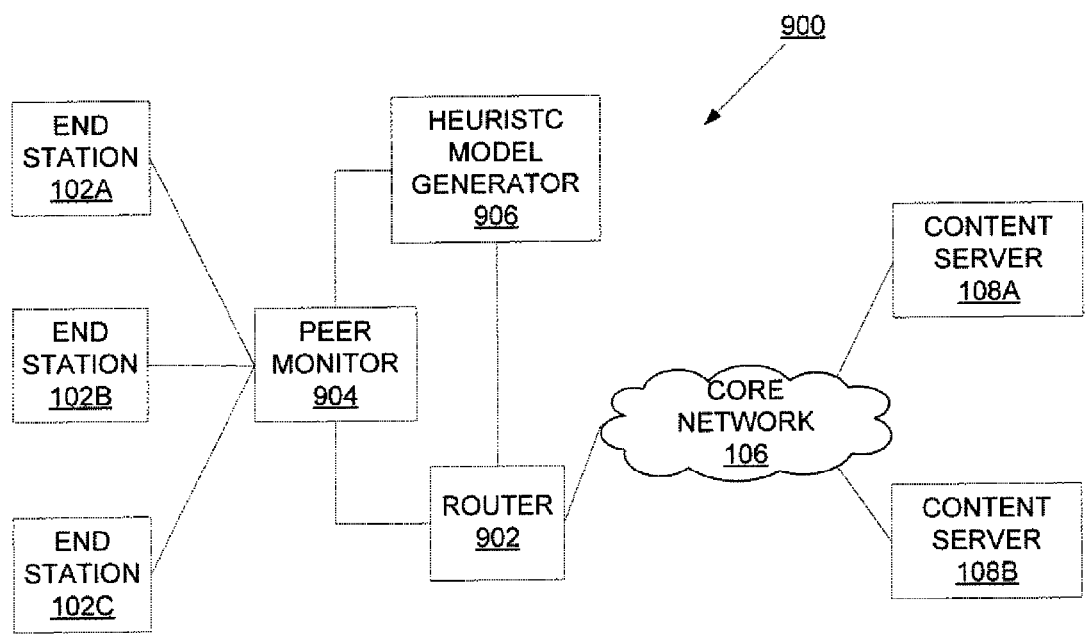
FIG. 9 illustrates one embodiment of a service provider network with a peer monitor, heuristic model generator and a router, where the router forwarding traffic between end stations content servers through a network.

FIG. 9 illustrates one embodiment of a service provider network 900 with a peer monitor 904, heuristic model generator 906, and router 902, where router 902 forwarding traffic between end stations content servers through a network. In FIG. 1, network 900 comprises end stations 102A-C, router 902, peer monitor 904, heuristic model generator 906, core network 106, and content servers 108A-B. End stations 102A-C couple to peer monitor 904 and peer monitor 904 couples to heuristic model generator 906 and router 902. End stations 102A-C can couple to peer monitor 904 through any one of the means know in the art (e.g., Ethernet, wireless, digital subscriber line (DSL), cable modem, fiber, etc.). Heuristic model generator 906 further couples to router 902 and router 902 further couples to core network 106. Router 902 provides an entry point into core network 106 by forwarding data traffic from end stations 102A-C to content servers 108A-B, from content servers 108A-B to end stations 102A-C, and data traffic going between end stations 102A-C. While in one embodiment, router 902 is an edge router detects and treats peer traffic as described above with reference to FIG. 3 and forwards traffic between the edge network servicing end stations 102A-C and core network 106, in alternate embodiments, router 902 can be a router or switch positioned differently in the service provider's edge and/or core networks.

In one embodiment, peer monitor 904 monitors peer traffic and captures statistics of the peer traffic flowing through peer monitor 904. In an alternate embodiment, peer monitors 904 monitors the peer traffics and generates statistics as well as treats the peer traffic (e.g., marks the peer traffic, restrict transmission rate, gives preferential treatment, etc.). Peer monitor 904 forwards the generated statistics to heuristic model generator 906. In addition, router 902 can also forward generated statistics to the heuristic model generator 906. Heuristic model generator 906 generates heuristic information based on the received statistics as described in FIG. 8, block 804. Furthermore, heuristic model generator 906 generates a new and/or updated heuristic model as described above at FIG. 8, block 806 and forwards the new/updated heuristics model to router 902. Router 902 uses the updated heuristic model detect peer traffic as describe in FIG. 3, block 310.

This implementation of the peer traffic detection is an example, and not by way of limitation. Thus, network elements having other architectural configurations can incorporate embodiments of the invention. Examples of other network elements that could incorporate embodiments of the invention could have multiple line and/or DPI cards or have a single line card incorporating the functionality of both the heuristic and DPI peer detection. Moreover, a network element having the heuristic and/or DPI peer detection functionality distributed across the traffic cards could incorporate embodiments of the invention.

DPI cards 504A-B as well as line cards 502A-N, and processor cards 506A-B included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (e.g., stores) information in a form readable by a machine (e.g., a computer). For example, a machine-readable medium includes read only memory (ROM); random access memory (RAM); magnetic disk storage media; optical storage media; flash memory devices; etc.

ALTERNATIVE EMBODIMENTS

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer method, comprising:
receiving a plurality of packets in a traffic flow;
processing all of the plurality of packets in the traffic flow in a first stage based on heuristic model analysis to detect a plurality of suspect peer packets in the traffic flow;
processing only the plurality of suspect peer packets in a second stage based on deep packet inspection to detect a plurality of verified peer packets in the plurality of suspect peer packets, wherein verified peer control and data packets are detected separately in the plurality of suspect peer packets based on the deep packet inspection;

processing the plurality of verified peer packets according to a peer policy, wherein the peer policy includes dropping the verified peer control packets to prevent subsequent verified peer data packet exchange and transmitting the verified peer data packets at a restricted rate; and processing packets of the traffic flow not detected as one of the plurality of verified peer packets according to a non-peer policy.

2. The computer method of claim 1, further comprising:
updating the heuristic model based on statistics associated with the plurality of suspect peer packets.

3. The computer method of claim 1, further comprising:
selecting the traffic flow from a plurality of traffic flows, wherein the selecting is based on a set of one or more characteristics associated with packets in the traffic flow, the set of characteristics includes one or more of ingress port, egress port, source address, destination address, packet type, virtual local area network tag, multi-protocol label switch tag, application type, and time of day.

4. The computer method of claim 1, wherein the heuristic model is based on external characteristics of the traffic flow, wherein the external characteristics is one of duration of packet flow, average packet size, and inter-packet gap.

5. A computer method, comprising:
performing a first stage packet inspection on a plurality of packets in a traffic flow comprising,
  detecting a plurality of suspect peer packets in the plurality of packets, and
  detecting a first plurality of non-peer packets in the plurality of packets, wherein the first stage packet inspection is based on a heuristic model analysis;
performing a second stage packet inspection on the plurality of suspect peer packets comprising,
  detecting a plurality of verified peer packets in the plurality of suspect peer packets,
  detecting a second plurality of non-peer packets in the plurality of suspect peer packets, wherein the second stage packet inspection is based on deep packet inspection, and
  separately detecting, based on deep packet inspection, a first subset of the plurality of verified peer packets as a plurality of verified peer control packets and a second subset of the plurality of verified peer packets as a plurality of verified peer data packets;
processing the plurality of verified peer packets according to a peer policy, wherein the peer policy includes dropping the plurality of verified peer control packets to prevent subsequent verified peer data packet exchange and transmitting the plurality of verified peer data packets at a restricted rate; and
processing the first plurality of non-peer packets and the second plurality of non-peer packets according to a non-peer policy.

6. The computer method of claim 5, further comprising:
collecting a set of statistics derived from at least the heuristic model analysis, wherein the heuristic model analysis is based on a heuristic model associated with the traffic flow;
generating heuristic peer traffic detection information based on the set of statistics;
updating a heuristic model based on the heuristic peer traffic detection information; and
detecting additional suspect peer packets in the traffic flow based on updated heuristic model analysis.

7. The computer method of claim 5, wherein the heuristic model is based on external characteristics of the traffic flow, wherein the external characteristics is one of duration of packet flow, average packet size, and inter-packet gap.

8. A non-transitory machine-readable medium that stores instructions, which when executed by a set of one or more processors, cause said set of processors to perform operations comprising:
receiving a plurality of packets in a traffic flow;
processing all of the plurality of packets in the traffic flow in a first stage based on heuristic model analysis to detect a plurality of suspect peer packets in the traffic flow;
processing only of the plurality of suspect peer packets in a second stage based on deep packet inspection to detect a plurality of verified peer packets in the plurality of suspect peer packets, wherein verified peer control and data packets are detected separately in the plurality of suspect peer packets based on the deep packet inspection;
processing the plurality of verified peer packets according to a peer policy, wherein the peer policy includes dropping verified peer control packets to prevent subsequent verified peer data packet exchange and transmitting verified peer data packets at a restricted rate, wherein the verified peer control and data packets are detected separately in the plurality of suspect peer packets based on the deep packet inspection; and
processing packets of the traffic flow not detected as one of the plurality of verified peer packets according to a non-peer policy.

9. The non-transitory machine-readable medium of claim 8, further comprising:
updating the heuristic model based on statistics associated with the plurality of suspect peer packets.

10. The non-transitory machine-readable medium of claim 8, further comprising:
selecting the traffic flow from a plurality of traffic flows, wherein the selecting is based on a set of one or more characteristics associated with packets in the traffic flow, the set of characteristics includes one or more of ingress port, egress port, source address, destination address, packet type, virtual local area network tag, multi-protocol label switch tag, application type, and time of day.

11. The non-transitory machine-readable medium of claim 8, wherein the heuristic model is based on external characteristics of the traffic flow, wherein the external characteristics is one of duration of packet flow, average packet size, and inter-packet gap.

12. An apparatus comprising:
a peer detection module comprising,
  a heuristic peer traffic detection module to detect a plurality of suspect peer packets in a traffic flow of data based on a heuristic model;
  a deep packet inspection traffic detection module to detect a plurality of verified peer packets in the plurality of suspect peer packets based on deep packet inspection of the plurality of suspect peer packets;
  a peer packet processing module to process the plurality of verified peer packets according to a peer policy, wherein the peer policy includes dropping verified peer control packets to prevent subsequent verified peer data packet exchange and transmitting verified peer data packets at a restricted rate, wherein the verified peer control and data packets are detected separately by the deep packet inspection traffic detection module and the verified peer control and data packets are detected in the plurality of suspect peer packets based on the deep packet inspection;

a non-peer packet processing module to process packets of the traffic flow not detected as one of the plurality of verified peer packets according to a non-peer policy; and a set of one or more physical interfaces through which a packet transmitter transmits the packets of the traffic flow not detected as one of the plurality of verified peer packets.

13. The apparatus of claim 12, wherein the heuristic peer detection module further comprises:

a heuristic update module to update the heuristic model based on statistics associated with the plurality of suspect peer packets.

14. A network element comprising:

a set of one or more deep packet inspection cards, each deep packet inspection card comprising a deep packet inspection processor;

a set of one or more line cards, each line card comprising a packet processor, wherein the packet processor is configured to, detect a plurality of suspect peer packets in a traffic flow of data based on a heuristic model, process a plurality of verified peer packets according to a peer policy, the peer policy includes dropping verified peer control packets to prevent subsequent verified peer data packet exchange and transmitting verified peer data packets at a restricted rate, wherein the plurality of verified peer packets are detected separately as verified peer control packets and verified peer data packets by the deep packet inspection processor on one of the set of one or more deep packet inspection cards and the plurality of verified peer packets are detected in the plurality of suspect peer packets based on deep packet inspection of packets in the plurality of suspect peer packets, process packets of the traffic flow not detected as one of the plurality of verified peer packets according to a non-peer policy; and a set of one or more control cards, the control cards to control forwarding of packets between the set of one or more line cards.

15. The network element of claim 14, wherein each control card comprises a heuristic update module to update the heuristic model based on statistics associated with the plurality of suspect peer packets.

16. The network element of claim 14, wherein the heuristic model is based on external characteristics of the traffic flow, wherein the external characteristics is one of duration of packet flow, average packet size, and inter-packet gap.

17. The computer method of claim 5, further comprising selecting the traffic flow from a plurality of traffic flows, wherein the selecting is based on a set of one or more characteristics associated with the plurality of packets in the traffic flow, the set of characteristics includes one or more of ingress port, egress port, source address, destination address, packet type, virtual local area network tag, multi-protocol label switch tag, application type, and time of day.

* * * * *

UNITED STATES PATENT AND TRADEMARK OFFICE
CERTIFICATE OF CORRECTION

PATENT NO. : 8,284,662 B2  
APPLICATION NO. : 12/043788  
DATED : October 9, 2012  
INVENTOR(S) : Sargor et al.

Page 1 of 2

It is certified that error appears in the above-identified patent and that said Letters Patent is hereby corrected as shown below:

In Fig. 1, Drawing Sheet 1 of 9, insert Referral Tag -- 100 --, above the figure.

In Fig. 6, Drawing Sheet 6 of 9, delete " 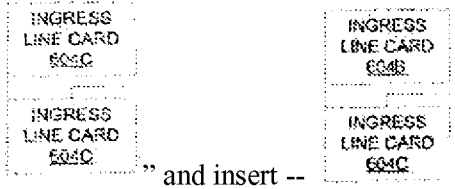 " and insert -- --, therefor.

In Fig. 7, Drawing Sheet 7 of 9, delete " 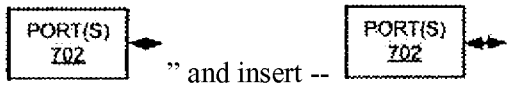 " and insert -- --, therefor.

In Fig. 9, Drawing Sheet 9 of 9, delete " 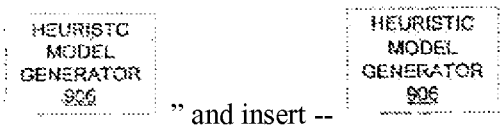 " and insert -- --, therefor.

In the Specifications:

In Column 1, Line 40, delete "download" and insert -- download, --, therefor.

In Column 2, Line 16, delete "station" and insert -- stations --, therefor.

In Column 2, Line 18, delete "(e.g." and insert -- (e.g., --, therefor.

In Column 2, Line 19, delete "handhleld" and insert -- handheld --, therefor.

In Column 2, Line 20, delete "laptop)" and insert -- laptop --, therefor.

In Column 2, Line 23, delete "Fiber," and insert -- fiber, --, therefor.

In Column 3, Line 7, delete "detective" and insert -- detecting --, therefor.

In Column 3, Line 26, delete "900" and insert -- 200 --, therefor.

In Column 4, Line 30, delete "processor" and insert -- processor, --, therefor.

In Column 4, Line 43, delete ""all" and insert -- "an --, therefor.

Signed and Sealed this  
Twenty-first Day of May, 2013

Teresa Stanek Rea  
*Acting Director of the United States Patent and Trademark Office*

CERTIFICATE OF CORRECTION (continued)
U.S. Pat. No. 8,284,662 B2

In Column 4, Line 45, delete "characteristic" and insert -- characteristic, --, therefor.

In Column 4, Line 46, delete "stricture," and insert -- structure, --, therefor.

In Column 4, Line 57, delete ""Coupled"" and insert -- "coupled" --, therefor.

In Column 5, Line 62, delete "processing" and insert -- processing. --, therefor.

In Column 5, Line 67, delete "set" and insert -- get --, therefor.

In Column 7, Line 11, delete "Such" and insert -- such --, therefor.

In Column 7, Line 22, delete "the to" and insert -- to the --, therefor.

In Column 7, Line 55, delete "form" and insert -- from --, therefor.

In Column 7, Line 65, delete "algorithm is" and insert -- algorithms --, therefor.

In Column 8, Line 14, delete "6048B-C" and insert -- 604B-C --, therefor.

In Column 8, Line 20, delete "e4gress" and insert -- egress --, therefor.

In Column 8, Line 36, delete "while ill" and insert -- while in --, therefor.

In Column 8, Line 45, delete "Point(s)" and insert -- Port(s) --, therefor.

In Column 8, Line 53, delete "points," and insert -- ports, --, therefor.

In Column 8, Line 60, delete "traffic" and insert -- traffic, --, therefor.

In Column 9, Line 4, delete "processors)" and insert -- processor(s) --, therefor.

In Column 9, Line 14, delete "form" and insert -- from --, therefor.

In Column 9, Line 18, delete "form" and insert -- from --, therefor.

In Column 9, Line 38, delete "in formation" and insert -- information --, therefor.

In Column 9, Line 41, delete "length" and insert -- length, --, therefor.

In Column 10, Line 51, delete "etc.)" and insert -- etc.). --, therefor.